No. 645,969. Patented Mar. 27, 1900.
J. J. McAREAVY.
MILK COOLER.
(Application filed Dec. 5, 1899.)

(No Model.)

Witnesses
C. H. Walker

John J. McAreavy, Inventor
By his Attorneys,
C. A. Snow & Co.

UNITED STATES PATENT OFFICE.

JOHN J. McAREAVY, OF SILVER CREEK, IOWA.

MILK-COOLER.

SPECIFICATION forming part of Letters Patent No. 645,969, dated March 27, 1900.

Application filed December 5, 1899. Serial No. 739,286. (No model.)

*To all whom it may concern:*

Be it known that I, JOHN J. McAREAVY, a citizen of the United States, residing at Silver Creek, in the county of Delaware and State of Iowa, have invented a new and useful Milk-Cooler, of which the following is a specification.

This invention relates to milk and cream coolers, and has for its object to provide an improved device of this character having means for conveniently applying a cooling agent directly to the milk or cream, so as to obtain the maximum effect of the former throughout the entire volume of the latter. It is, furthermore, designed to provide a receptacle in which the milk or cream may be retained after being cooled, so as to maintain the latter in its cool condition and prevent it from becoming sour, and also to provide for the convenient removal of the milk-vat for cleansing the latter and without removing any fastenings or otherwise disturbing any of the parts of the device.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the invention.

Figure 1:
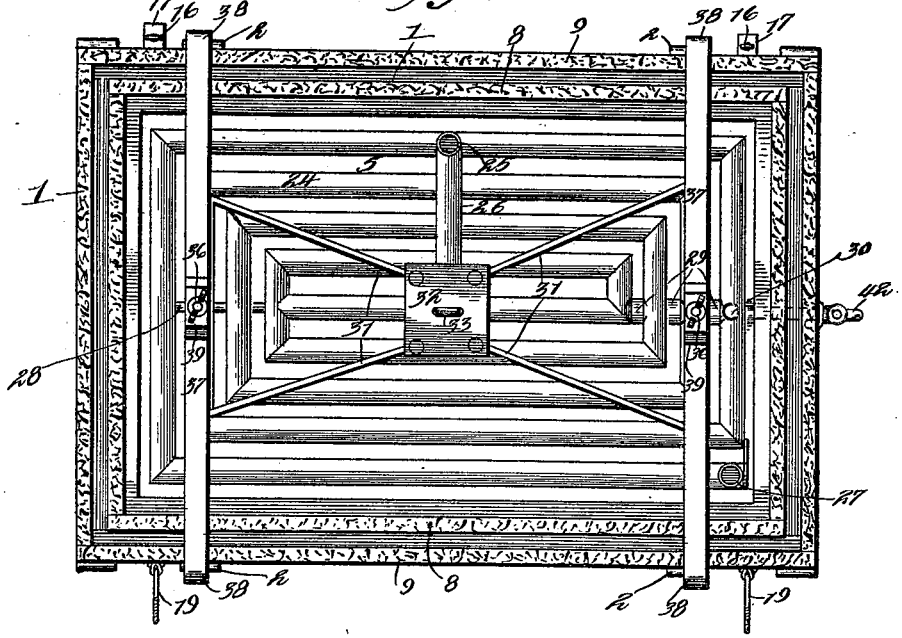
Figure 2:
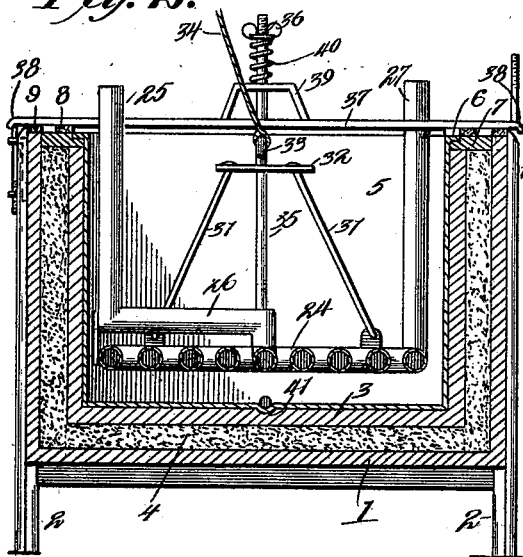
Figure 3:
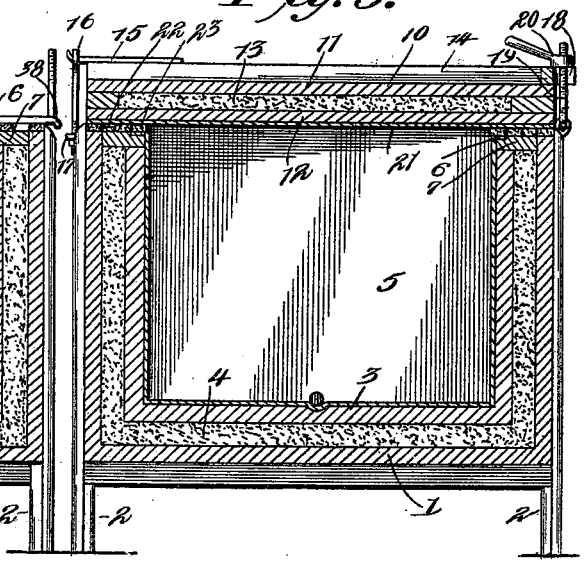

In the drawings, Figure 1 is a top plan view of a milk-cooler constructed in accordance with the present invention and having the cover removed. Fig. 2 is a transverse sectional view thereof. Fig. 3 is a transverse sectional view having the pipe-coil removed and the cover in place.

Corresponding parts in the several figures of the drawings are designated by like characters of reference.

Referring to the accompanying drawings, 1 designates an outer receptacle, preferably formed of wood and of substantially-rectangular form and supported upon suitable leg-standards 2, located at the four corners of the receptacle. Located within this outer receptacle is a smaller similarly-shaped receptacle 3, which provides an intervening space between the sides, ends, and bottoms of the two receptacles, said space being filled with a non-conducting packing 4, of sawdust, charcoal, or the like, so as to keep out external heat.

Removably fitted within the inner receptacle and snugly engaging the walls thereof is a metallic vat 5, the upper edges of which are provided with outwardly-directed marginal flanges 6, to which are connected longitudinal wooden strips 7, forming extensions of the flanges and resting upon the upper edges of the inner receptacle and the non-conducting packing, so as to cover and protect the latter. Extending longitudinally upon the upper sides of the wooden strips 7 and adjacent to the metallic flange of the vat are the packing-strips 8, and other packing-strips 9 are provided upon the upper edges of the outer receptacle, so as to provide intervening spaces between the respective packing-strips 8 and 9.

A cover 10 is provided for the upper open end of the receptacle and preferably comprises upper and lower sections 11 and 12, between which is placed a suitable non-conducting filling 13. Adjacent to each end of the cover and upon the upper side thereof there is provided a transverse strengthening-bar 14, one end of which is provided with a hook 15, projecting beyond the adjacent side of the receptacle and designed for detachable engagement with a vertically-adjustable screw-eye 16, which latter is carried by a screw-threaded seat formed by a suitable lug or ear 17, projecting outwardly from the outer receptacle. When the cover is not in use, the screw-eye 16 may be moved downwardly through the lug or ear 17, as indicated in Fig. 2, so that the upper edge of the device may be free from projections. It will be noted that the respective hooks 15 and the screw-eyes 16 form a hinged connection for the cover, and this connection may be adjusted to bind the cover tightly upon the upper edges of the receptacle by means of the respective screw-eyes 16, which form the fixed or stationary members of the hinges. The opposite end of each bar 14 projects beyond the adjacent edge of the cover and is provided with a longitudinal bifurcation 18 for the reception of a bolt 19, which is hinged to the exterior of the outer receptacle and is provided with a suitable handled nut 20 for engagement with the upper side of the bar 14, so as to bind the cover tightly upon the receptacle. The under side of the cover is preferably lined with a metal sheet 21, and secured thereto are the spaced marginal packing-strips 22 and 23, which fit, respectively, between the packing-strips of the inner receptacle and at the inner sides of the packing-strips 8, thereby forming an air-tight closure between the cover and the receptacle. It will be observed that the packing-strips 22 and 23 embrace the packing-strip 8 upon the flanged portion of the removable vat, so that the cover may effectively close the open end of the vat when the latter has been removed from the body of the receptacle.

Located within the vat 5 is a pipe-coil 24, through which a liquid cooling agent, as water, is adapted to circulate. The water is introduced through an upright pipe or passage 25, which is located intermediate of the opposite ends of the coil and normally projects above the upper edges of the receptacle. The lower end of this upright pipe is provided with a horizontal branch pipe 26, which connects with the central member of the coil. As indicated in Fig. 2 of the drawings, an upright discharge-pipe 27 is provided at the outer extremity of the coil, so as to carry off the water from the latter. At one side of the coil the members thereof are connected and braced by means of a transverse rod 28, and opposite this brace the adjacent coil members are connected by short branch pipes 29, which besides bracing the coil members form a direct communication therebetween, and adjacent to the outer branch pipe there is provided a discharge-opening normally closed by means of a screw-cap 30 and designed to effectively drain the coil.

Converging inwardly and upwardly from opposite ends of the coil are the brace-rods 31, which have their upper ends connected by means of a flat plate 32, the latter being provided with a centrally-located hook or eye 33, to which is connected a rope or other device 34, whereby the coil may be vertically reciprocated within the vat and the volume of milk or cream, so as to obtain the maximum effect of the cooling agent throughout the entire volume of the milk or cream.

Rising from opposite ends of the coil are the guide-rods 35, which normally project above the upper edges of the receptacle and provided with heads 36 at their upper ends. These guide-rods are slidable vertically through transverse guide-bars 37, which latter rest upon the opposite upper edges of the receptacle and have their opposite ends provided with hooks 38 for engagement with the opposite outer sides of the receptacle, so as to prevent accidental longitudinal displacement of the guide-bars. Each guide-bar is provided with an intermediate bridge 39, through which the adjacent guide-rod passes, and encircling the upper end of the rod is a coiled spring 40, which bears in opposite directions against the head 36 and the bridge 39, so as to normally maintain the pipe-coil above the bottom of the vat and to cushion the coil in its return or downward movement.

As indicated in Figs. 2 and 3 of the drawings, the bottom of the vat is provided with a gutter 41, which is inclined longitudinally toward one end of the receptacle, and a suitable valve or faucet 42 is in communication with the lower end of this gutter, so as to effectively drain the vat.

In the operation of the device the cover is removed and the coil placed within the vat and also within the milk or cream contained within the latter. Water of a lower temperature than the milk is then introduced through the upright pipe 25, circulates through the coil, and is discharged through the pipe 27, the discharged water being conducted from the device in any preferred manner. It will thus be apparent that the cooling agent acts directly upon the milk, so as to separate the animal heat therefrom, and by reciprocating the coil through the volume of milk the cooling agent will be applied to every part of the milk, so as to obtain the maximum cooling effect. After the milk has been brought to the desired temperature the coil is removed from the device and the cover applied in the manner hereinbefore described, so as to exclude exterior heat and to maintain the milk in its cooled condition for a considerable length of time, and thereby prevent such milk from becoming sour.

As indicated in Fig. 2 of the drawings, it is preferable to have the upper extremities of each guide-rod 35 screw-threaded and to employ a suitable winged nut to form the head 36, so that the latter may be adjusted to vary the tension upon the coiled spring 40, and also to provide for the application and removal of the guide-bar 37.

What I claim is—

1. A milk and cream cooler, comprising a receptacle for containing the milk or cream, a reciprocatory pipe-coil located within the receptacle and receiving a liquid cooling agent, upright guide-rods extending from the coil, and removable guide-bars resting upon the upper edges of the receptacle and slidably receiving the guide-rods.

2. A milk and cream cooler, comprising a receptacle for containing the milk or cream, a reciprocatory pipe-coil located within the receptacle and receiving a liquid cooling agent, upright guide-rods extending from the coil, guides carried by the receptacle and slidably receiving the respective guide-rods, and springs connected to the guides and the guide-rods, supporting the coil above the bottom of the receptacle, and cushioning the said pipe-coil.

3. A milk and cream cooler, comprising a receptacle for containing the milk or cream, a reciprocatory pipe-coil located within the receptacle and receiving a liquid cooling agent, upright headed guide-rods extending from the coil, removable guide-bars resting upon the upper edges of the receptacle and slidably receiving the respective guide-rods, hooks at opposite ends of the bars and engaging the adjacent sides of the receptacle, and coiled springs encircling the respective guide-rods, bearing in opposite directions against the heads of the latter and the adjacent guide-bars, and yieldingly supporting the pipe-coil above the bottom of the receptacle.

4. A milk and cream cooler, comprising a receptacle, a pipe-coil located within the receptacle and receiving a liquid cooling agent, and provided with branch pipes connecting adjacent members of the coil, and a normally-closed discharge-opening located adjacent to one of the branch pipes.

5. A milk and cream cooler, comprising a receptacle for containing the milk or cream, and having spaced packing-strips upon its upper edges, and a cover having spaced packing-strips provided upon its under side and fitting between the packing-strips of the receptacle.

In testimony that I claim the foregoing as my own I have hereto affixed my signature in the presence of two witnesses.

JOHN J. McAREAVY.

Witnesses:
WILLIAM WOOD,
W. J. GREEN COGGON, Jr.